(12) United States Patent
Manz et al.

(10) Patent No.: US 9,164,860 B2
(45) Date of Patent: Oct. 20, 2015

(54) METHOD FOR REPRESENTATION OF SAFETY-RELEVANT INFORMATION ON A DISPLAY AND APPARATUS FOR THE APPLICATION OF THE METHOD

(75) Inventors: Holger Manz, Bergisch-Gladbach (DE); Rudolf Ganz, Overath (DE); Thorsten Haas, Berlin (DE)

(73) Assignee: Deuta-Werke GmbH, Bergish Gladbach (DE)

( * ) Notice: Subject to any disclaimer, the term of this patent is extended or adjusted under 35 U.S.C. 154(b) by 0 days.

(21) Appl. No.: 13/382,433

(22) PCT Filed: Jul. 5, 2010

(86) PCT No.: PCT/EP2010/059572
§ 371 (c)(1),
(2), (4) Date: Jan. 5, 2012

(87) PCT Pub. No.: WO2011/003872
PCT Pub. Date: Jan. 13, 2011

(65) Prior Publication Data
US 2012/0098842 A1    Apr. 26, 2012

(30) Foreign Application Priority Data

Jul. 6, 2009  (EP) ..................................... 09164672
Mar. 9, 2010  (EP) .................. PCT/EP2010/052946

(51) Int. Cl.
*G06F 11/00*     (2006.01)
*G06F 11/263*    (2006.01)
*G09G 3/00*      (2006.01)

(52) U.S. Cl.
CPC .............. *G06F 11/263* (2013.01); *G09G 3/006* (2013.01)

(58) Field of Classification Search
CPC .............................. G06F 11/263; G09G 3/006
See application file for complete search history.

(56) References Cited

U.S. PATENT DOCUMENTS 5,175,772 A * 12/1992 Kahn et al. .................... 382/141
5,394,486 A    2/1995 Eisenbarth et al.
(Continued)

FOREIGN PATENT DOCUMENTS

DE     3411015 A1    9/1985
DE     4332143 A1    3/1995
(Continued)

OTHER PUBLICATIONS

Int'l Search Report issued Aug. 6, 2010 in Int'l Application No. PCT/EP2010/059572; Written Opinion.
(Continued)

*Primary Examiner* — Michael Maskulinski
(74) *Attorney, Agent, or Firm* — Panitch Schwarze Belisario & Nadel LLP (57) ABSTRACT

A method to ensure the dependable representation of a safety-related information includes: entry of at least one input parameter into a processor, computerized processing of the input parameter transforming it into a sequence of image data that represents the input parameter, transmittance of the sequence of image data on to a display and representing the sequence of image data on the display. It is proposed to feed the sequence of image data and to a test unit and to perform a safety test in the form of computerized generation of a test code for the sequence of image data, comparing the test code with several existing reference codes, assigning the identified reference code to a corresponding possible value of the input parameter and comparing it with the value of the input parameter to generate either a positive or negative test result to initiate a safety-focused reaction.

22 Claims, 4 Drawing Sheets

(56) References Cited

U.S. PATENT DOCUMENTS

| | | | |
|---|---|---|---|
| 5,508,721 A * | 4/1996 | Hattori | 345/554 |
| 6,277,098 B1 * | 8/2001 | Klitmose et al. | 604/207 |
| 6,778,080 B2 | 8/2004 | Veil et al. | |
| 6,839,055 B1 | 1/2005 | Nguyen | |
| 7,006,117 B1 * | 2/2006 | Man et al. | 345/501 |
| 7,702,703 B2 * | 4/2010 | Sano et al. | 708/208 |
| 8,543,349 B2 * | 9/2013 | Katchan et al. | 702/108 |
| 8,583,999 B2 * | 11/2013 | Morino et al. | 714/807 |
| 2004/0249522 A1 | 12/2004 | Bernard et al. | |
| 2005/0276514 A1 | 12/2005 | Fisher | |
| 2006/0069963 A1 | 3/2006 | Miglianico | |
| 2007/0046680 A1 | 3/2007 | Hedrick et al. | |
| 2008/0100611 A1 | 5/2008 | Block et al. | |
| 2010/0283858 A1 | 11/2010 | Katchan et al. | |

FOREIGN PATENT DOCUMENTS

| | | |
|---|---|---|
| DE | 10229342 A1 | 1/2004 |
| DE | 10252124 B4 | 11/2006 |
| EP | 0584895 A2 | 3/1994 |
| EP | 0856792 A2 | 8/1998 |
| EP | 2 254 039 B1 * | 12/2012 |
| FR | 2908225 A1 | 5/2008 |
| JP | S64-38825 A | 2/1989 |
| JP | H02-143323 A | 6/1990 |
| JP | H05-334112 A | 12/1993 |
| JP | H06-161814 A | 6/1994 |
| WO | 2007104531 A1 | 9/2007 |

OTHER PUBLICATIONS

English translation of an Office Action issued Jul. 9, 2013 in JP Application No. 2012-518950.
English translation of an Office Action issued Jan. 3, 2014 in CN Application No. 201080030506.7.
Opposition to EP Patent No. 2353089 by Bombardier Transportation GmbH, filed Feb. 27, 2013.
Opposition of EP Patent No. 2353089 by Digital Simplex Pte. Ltd., filed Feb. 26, 2013, No Translation.
"Graphics Display Controller Product Update," Presentation by Dan Landeck of Fujitsu at Convergence 2008.
Kjellberg, "Display it safe," iVT Magazine, Mar. 2009.
Opposition of EP Patent No. 2353089 by Digital Simplex Pte. Ltd., filed Feb. 26, 2013 (Summary of Grounds for Opposition in English) Only 1 page translation of Summary of Grounds for Opposition.

* cited by examiner

Fig. 4

METHOD FOR REPRESENTATION OF SAFETY-RELEVANT INFORMATION ON A DISPLAY AND APPARATUS FOR THE APPLICATION OF THE METHOD

CROSS-REFERENCE TO RELATED APPLICATIONS

This application is a Section 371 of International Application No. PCT/EP2010/059572, filed Jul. 5, 2010, which was published in the English language on Jan. 13, 2011, under International Publication No. WO 2011/003872 A1 and the disclosure of which is incorporated herein by reference.

BACKGROUND OF THE INVENTION

The present invention relates generally to a method for representing or display of safety related information safely, especially by detecting safety-critical errors within the computation of information in order to generate image data preferably involving the method steps: entry of at least one recorded value of an input parameter into a processor, computerized processing of the input parameter transforming it into a sequence of image data that represent the input parameter, transmitting of the sequence of image data to a display and representing or display of the sequence of image data on that display.

Currently, TFT displays are used increasingly as display units in many applications, in control and monitoring systems for example. In addition to the said cases, TFT displays are more commonly used to display safety-critical information in the field of train-control or airplanes, for instance. Generally, units of this kind are based on a micro controller or PC equipped with software running on an operating system.

A failure is considered to be a safety-critical failure if the display only seems to work well or seems to show the correct (consistent) information but actually does not represent the true (factual) information provided to the display unit, for example not the train's actual speed. The display only shows a seemingly correct value, the failure, however, cannot be detected as such by the observer.

Existing methods and devices for application of the methods comprise a processor that generates a sequence of image data corresponding to the input parameter, image or vector-oriented for example, in order to show the sequence of image data on the display. The display can be of any design, a monitor or TFT for example, with the latter frequently being used today. As the present invention is independent from the display used, insofar any applicable technology can be considered. The processing unit is connected to the display (panel) via common digital interfaces, like LVDS.

The detection method and device according to a preferred embodiment of the present invention do not include the display, but considers it a perfect and therefore flawless system in this context. This is based on the assumption that a typically extremely low failure rate of the display, especially the display panel in particular relating to those errors which might contribute to safety related errors as defined above. Nevertheless, it is of decisive importance that the value of the input parameter recorded and processed by the system is correctly shown on the display.

Common methods and apparatuses for application of the methods are based on the assumption that a display failure results in an obviously false image and thus is apparent to the observer. The displayed data may be non-constant or interrupted for example, may change, for instance, their color, a figure may be cancelled or shown in a distorted shape. Further, it is to be noted that a failure or an error in the display itself will also lead to a visibly wrong representation of the data.

Present methods and devices to generate digital image data are generally very error-prone due to their inherent complexity. Errors may occur in each single step of the computation, by a defect micro-processor for instance. They may also occur within the graphics controller, the individual memory modules, the power supply or also the display application software whereas these may even result from errors in the graphic software library or other software libraries used by the particular application software. Therefore, a safety test or approval to certify the overall system is very complex and must always comprise all components, hardware, firmware and all software involved, including the operating system. Even more so any up-date or modification/alteration of the system components including the software requires a new certification of the complete system. For practical purposes, such a process is tedious and very expensive, even though strictly necessary with methods and devices according to the prior art.

Methods of a different nature to ensure safe visualization of image data are known from the patents DE 4 332 143 A and EP 0 856 792 A. DE 10 2004 039 498 A1 discloses pixels that can be verified by placing one ore more light-sensitive sensors on monitored areas of TFT display and then sending the output signal produced by said one or more sensors to the subordinate computer.

BRIEF SUMMARY OF THE INVENTION

An objective of a preferred embodiment of the present invention is to provide an improved method for dependable representation of safety-relevant information on a display and apparatus for application of the method thus avoiding, to a large extent, the disadvantages as outlined above and especially allowing a simple replacement or modernization of the system components.

In the simplest preferred embodiment of the present invention, this task is already achieved by the following steps: transmitting the sequence of image data to a test unit, making a safety test by computerized generation of a test code (Fingerprint) for the sequence of image data, checking the test code against several—discrete—reference codes, assigning the then identified reference code to a corresponding possible value of the input parameter and comparing it against the value of the input parameter. Preferably, the test of checking the test codes against the reference codes is carried as an integrated step in the test unit, meaning that the reference codes are integrated in the test unit. In a simplified preferred embodiment, however, this evaluation can also be performed in another component comprising the required data.

It is clear for the person skilled in the art that a preferred embodiment of the present invention presents a highly efficient and safe method to ensure the dependable (safe) representation of a safety-related information, especially via pixel based visualization.

Thus, the test unit generates either a positive or a negative test result for the initiation of a safety-focused reaction. Accordingly, the test unit can contain several countable and distinct—discrete—reference codes in the form of a chart, for example, being characteristic for each respective application. Further, each of the possible values of the input parameter is assigned to each reference code. If, for example, the method is applied to examine or test a display in a speedometer in a railcar, the several reference codes may represent different velocities in steps of 1 km/h, for example.

After calculation of the test code the safety test provides a check-up in form of a "look-up" comparing the test code with the existing reference codes. If no respective reference code can be determined, the safety-focused reaction may already be initiated at this stage. In fact, in complex presentation like in control rooms this may already discriminate forbidden operating states of the monitored system reflected by the visualization on the screen. If, however, a respective reference code is identified, the test unit assigns the corresponding possible value to the input parameter, on the basis of the above mentioned chart, for example. This identified valid value of the input parameter will then be checked against the actual input parameter, if necessary admitting a tolerance. In case the safety test leads to a negative result the safety-related reaction may then be initiated.

The reference codes systematically feature a sufficient separation and Hamming-distance for requested fault suppression, in order to realize a quantifiable differentiation of the several display conditions, as well accordingly a quantifiable differentiation of unknown display conditions.

In principle, all methods that clearly indicate a safety-critical failure to the observer are suitable as safety-focused reactions. Possible safety-focused reactions related to application may be, for example: switching off the display completely or to a certain extent, providing data distribution, masking or distortion, switching off the computer unit, thus ensuring its safe condition or communicating the safety-critical failure to a superordinate unit.

The test unit therefore realizes a test of the computer unit that is completely independent from the computer unit using particularly simple means and being based on the astonishing finding that all safety-relevant system failures are already detected by the safety test through the test unit.

The method and the apparatus for the application of the method are therefore completely independent of the computer which generates the graphics data including the system components, as there are for example, the processor, the graphic card and the like, for example, the current computer technology, especially also the operating system. A preferred embodiment of the present invention therefore involves surprisingly simple means and nevertheless discloses all safety relevant failures of a complex computing device under surveillance.

Contrary to the state of the art, when replacing the computer unit components and up-dating the software regularly a safety certification according to the required safety integrity level (SIL) is no longer necessary because of the introduction of the safety test realized by the test unit all or part of the data determined to be displayed. Consequently, the method according to a preferred embodiment of the present invention always allows for the latest technology to be used within the graphics data generating computer unit without jeopardizing the existing safety certification. In a nutshell, the present invention realizes a particularly simple test of the sequence of image data by comparison with the value of the input parameter to be displayed.

According to experts comprehension of the scope of protection of a preferred embodiment of the present invention, the signals of the input parameters, which are to be transmitted via common interfaces between the computer unit, the display and the test unit, may be analogue as well as digital. The reference codes may be realized by a circuit, as a shift register for example or by programming.

Preferably, the safety-focused reaction will be initiated by the test unit itself, by interrupting the power supply of the display for example. Due to a preferred embodiment of the present invention, however, it is also possible that in order to initiate the safety-focused reaction, the test unit will, dependent on the test result, only send a control signal to another system component or a superordinate system, a processor that differs from the test unit for instance.

It is apparent for the person skilled in the art how to generate optimal image representations corresponding to the reference codes in a pre-operation phase. Generally, the suggested test method and device to put the method into practice may not only be applied to representations of symbols with different conditions (for example, ON/OFF), but also representations showing quantified visualizations of analogue input values, for example, pointer instruments or bar graphs. For instance, a voltage ranging between 0 volt and 100 volts as the input parameter can be interpreted as steps or reduced to steps of 1 volt each, adding up to 101 single display representations, which are displayed as a circular instrument via software. Thereby, each single image shows the respective correct position of the pointer.

To realize an animated dependable representation the safety test will preferably be carried out by performing a periodic test with a frequency up to the frame rate of the display and/or of the rate of change of the input parameter.

In case of a particularly preferred embodiment to clearly identify a display condition a safety test is sufficient that is limited to relevant subareas or segments of the image representation to be displayed, which characterize the specific displayed data to the observer. These can be the corresponding lines and columns of an image representation or a stump of the pointer of a circular instrument for example. Provided that the un-monitored area outside of the relevant subarea and the monitored area inside the relevant subarea show different content the observer can recognize this difference and the error will not be considered safety critical. On the contrary, if the displayed data in the uncontrolled area outside the monitored subarea and the displayed data in the monitored area inside the relevant subarea differ from each other the observer is able to recognize this discrepancy as an error.

Practically all quantifiable input parameters comply with the above mentioned requirements as per description. But also textual information shown in a specific section of the display can be tested by the present method (where applicable, each single alphabetic character or a given word presents such display condition).

The test unit can be a separate device or integrated within the graphic generating computer unit as well as within a separate monitor unit. A software-controlled realization has the particular advantage that even more extensive independence of the processor in regard of platform and software is possible.

In order to achieve a sequential error tolerance a further development allows the safety-focused reaction to be initiated only after a predefined number of negative test results. It can also be intended that a certain threshold value necessary to switch off the display will be reached faster because the negative test results are taken into account with a larger factor, instead of the deduction of negative results because of positive results.

A possible way to improve the horizontal error tolerance is to consider a safety test result as a positive one even if the value of the input parameter corresponds to several possible and admissible reference values of the input parameter resulting from the safety test. This allows for, if a supervised vehicle accelerates for example, the "neighboring" reference codes archived in the test unit or adjacent to a predefined environment to also be considered as positive test results. The time and/or value of tolerances relevant for a respective application can therefore be easily taken into account when generating the reference codes and carrying out the safety test.

The method and apparatus for the application of the method according to a preferred embodiment of the present invention naturally allow several input parameters of the processor to also be processed in a sequential and/or parallel way and checked against different groups of reference codes in the test unit after generation of different test codes. In principle, it is possible within the scope of the present invention to provide several separate test units for separate displays or for different input parameters.

As mentioned above, for the application of the method any interface and therefore all current means for the transmittance of image data can be applied between the system components. This can be, for instance, a LVDS or a comparable standardized digital data signal for the transmittance of data between the processor and the display.

The coding methods used during the safety test in order to generate test codes of determined length may, for example, be CRC 16, CRC32 or an equally common coding method.

The safety test of different segments of the image data sequences maybe made in parallel and independently from each other in the test unit to ensure a more rapid processing. Sequential image data may be viewed separately according to their different colors for example.

In a preferred embodiment the test unit is designed as a field programmable gate array (FPGA). As is generally known, this is a programmable integrated circuit used in digital technology thus providing a programmable logic circuit according to the application. It may, however, also be realized in the form of a DSP controller or by means of a hardware solution in full or in part.

A preferred embodiment of the present invention also relates to a safety unit to display a safety-relevant information, especially to put the method mentioned above in to practice, by means of a processor fed with at least one input parameter in order to transform this input parameter into a sequence of image data and a display connected to the processor to display the sequence of image data. On the basis of the state of the art including its disadvantages as described above, the task which results thereof will be performed by means of a test unit together with a test code generator, several reference codes according to the application and a reference unit, with the test code generator calculating a test code for at least one read-out part of the sequence of image data. The resulting test code is compared with the existing reference codes and in case of a positive conformity the resulting reference code is assigned a corresponding value of the input parameter as a reference value. The reference value will then be checked against the input parameter in or outside of the reference unit in order to initiate a safety-focused reaction if the safety test leads to a negative result.

The actuality of the safety test and thus the tested data can be verified from the outside by including a check value, for example, a random number, into the input value data transmission. This check value can than either be computed into a graphical representation by the graphics generating computer, commonly called a PC, or be directly transferred into the data stream to the TFT panel, for example, as color index values of one or more pixels which are then either read directly by the test unit or coded similar to the monitored area(s). Together with the codes of the monitored area(s) these values are then transmitted to the super ordinate—safe—computer in which, for instance, a time-test for the evaluated data can be performed. If the time-lag between transmission of new input values and the reception of the return values is larger than a predefined and adjustable value this is clear indication that the actual value is not up to date.

Alternatively the check value/random number may be interpreted as a binary code by the graphics generating unit which can then drive several distinct areas on the display, for example switching them black or white according to a particular bit in the binary code set as low or high.

In a preferred embodiment illumination of these pixels can then be verified by placing one ore more light-sensitive sensors on monitored areas of TFT display and then sending the output signal produced by said one or more sensors to the subordinate computer, as disclosed in German Patent application DE 10 2004 039 498 A1 by the applicant. Hence, if the displayed number is correct the correct value is also returned to the subordinate computer and error-free operation is thus confirmed. Preferably the check value is changed in sync with changing data to be displayed on display.

In yet another preferred embodiment of the present invention, the check value is transmitted as a bit-pattern to small areas of the display, preferably to areas at the edge of the display and displayed there, most preferably on an area not or hardly visible to the user. This displayed area is then read back and coded just like any area of the other sections of display or as a value of the color setting of a single (or several) pixels (e.g. RGB color value) which can then be read back by the test unit from the connection between PC and display and can then either be processed directly or be coded by the code generator. It can, for example, be required that this check value is returned either through the test unit or directly to the subordinate processor in a certain period of time in order to verify a false—free operation of the system.

One especially interesting aspect of a preferred embodiment of the present invention is that the above-mentioned check-values/pixels can also be used as a data-container that, while transmitted from the computer generating the image data corresponding to the input value. As is well commonly known, each Pixel of a TFT display is made up of three subordinate pixels in RGB colors (red, green, blue). By lighting up the subordinate pixels any desired color for the pixel can be obtained. A preferred embodiment of the present invention now uses these pixels as data containers to transmit data from the subordinate system or the computer generating the image data to the display. This data-container can, for example, be used to transmit a reference value via the line between the computer and the display. Through the graphics controller the display may display this "incorrect" pixel according to its value but one single pixel is practically irrelevant and will hardly be noticed by an observer. Irritations for the observer can further be avoided by using pixel as data-containers that are located in the outer areas of the display and can easily be covered. However, this reference value can now be read out directly from the connection between the PC and the display and transmitted to the test unit, thus no longer requiring the reference value to be looped through the PC to transmit it to the test unit. This has the crucial advantage that the image data generated by the computer and the reference value corresponding to the image data are transmitted in unison via the same channel and can no longer be separated. Hence, the specific reference value always corresponds to the image data generated, thus the reference value and the image date are always synchronous. Provisions for fault tolerance, like loops and cycles, involved in the transmission of the reference value looped through the computer for comparison with the correct image data read back from the display and then processed in the test unit are therefore no longer necessary because a difference between the reference value and the associated image date is impossible. Instead the reference value can than be read out via the connection between the computer and the display, most commonly an LVDS, and then be fed directly into the test unit, preferably into the comparator in which it is compared to the test code generated by the code generator.

This pixel serving as a data container can also be used for other aspects to improve the invention. It can, for instance, be used to store and transmit secure data like CRCs for relevant data or as data to change the area and/or range of supervised areas on the display which are monitored by the test unit. The pixels used as data containers can, for example, transmit the coordinates of the upper left corner and the coordinates of the lower right corner of a supervised section on the display for a given instance. This means that by changing the supervised sections on the display by transmitting the coordinates of the supervised section with the pixels as data containers the location and/or size of the supervised sections on the display can be changed during operation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Further details, advantages and characteristics of the present invention can be obtained from the following part of the description with detailed explanation of examples of the preferred embodiments of the method and apparatuses for the application of the method according to the present invention, with reference to the drawings of which in the drawings.

DETAILED DESCRIPTION OF THE INVENTION

Equal and corresponding components are provided with the same reference marks.

Figure 1:
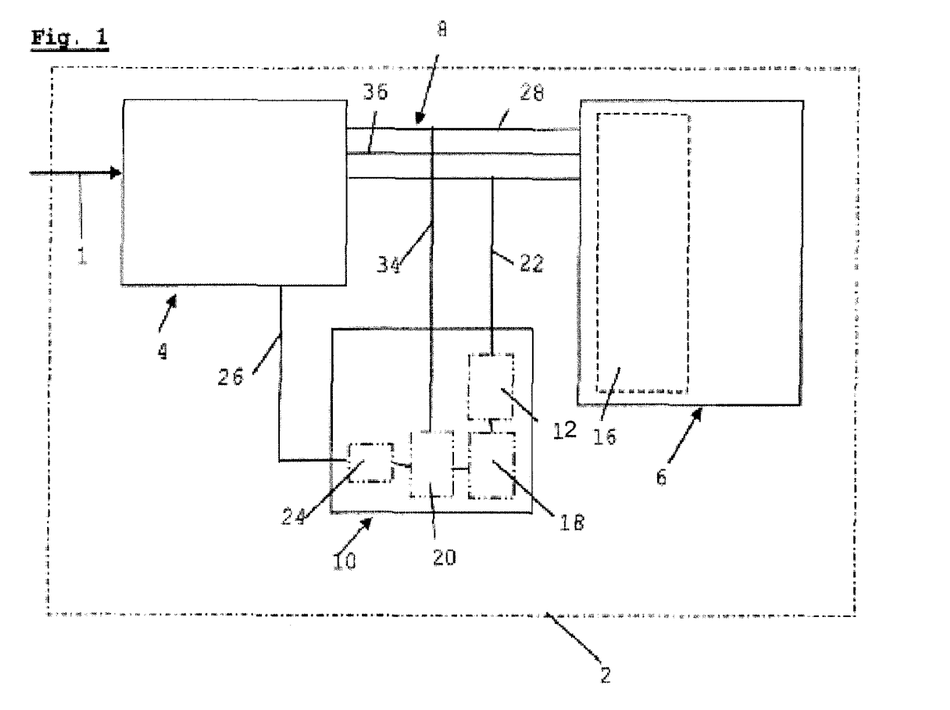
FIG. 1 shows a schematic diagram of a principle configuration of a first preferred embodiment of a safe display in accordance with the present invention for a panel PC, for example, in a railcar.

FIG. 1 shows the principle configuration of a safety unit 2 for the application of the method in a railcar of a train according to a preferred embodiment of the present invention.

Consequently, the safety unit marked with 2 at large consists of a PC 4 for generating image data representing the processor and a display apparatus which is a TFT display 6 connected via a LVDS 8 that comprises several circuits with only 3 of them, however, being shown schematically.

The safety unit 2 also preferably includes a test unit that is designed as a combination of an FPGA 10 and micro controller units, simply called FPGA 10.

In the example shown an input parameter in the form of a velocity value ($V_{actual}$) indicated with reference mark 14 and which can, for example, originate from a main computer in compliance with common safety standards and regulations "safe computer", is communicated to PC 4. This value can be looped through PC 4 and transmitted to the safe test unit 10 via an input circuit 26. Alternatively, the value of the input parameter 14 may also be directly transmitted to the FPGA 10.

PC 4 transmits the safety-relevant information via display line 36 to be displayed on a delimited supervised area 16 of the TFT display 6. The safety-relevant information is displayed in the form of a "pre-rendered" and, as a consequence, definitely predefined bitmap on the TFT display 6.

The high-frequency input signal of the TFT display 6 fed in via one line of the LVDS 8 is read out or read back by the FPGA 10 via the read-back line 22.

For carrying out the safety test the safe test unit 10 generates a CRC check sum in a test code generator 12 for the pre-rendered bitmap of supervised area 16, thus generating a "fingerprint" of this supervised area 16 at a given instance. Every bitmap generated by the PC 4 has a clearly assigned a pre-calculated CRC check sum as a reference code according to a chart 18 of the FPGA 10 and a possible value of the input parameter 14 is provided for each of these reference codes.

First the safe test unit 10 compares the test code calculated by the test code generator 12 with the reference codes according to the chart 18. If the test code is in accordance with a reference code listed in chart 18 the possible value of the input parameter according to the chart 18 is then compared by a comparator 20 with the value of the input parameter stored in a memory 24. If inadmissible discrepancies are determined during the process, a safety-focused failure reaction can be initiated by interruption of the power supply circuit 28 of the TFT display 6 via interruption line 34.

A decisive factor for the safety-relevant evaluation of the speed display is the timely display of a corresponding speed value within admissible tolerances of time and value.

The switch-off function activated by the FPGA 10 in the present preferred embodiment works according to the "closed circuit current principle" (equivalent to safety-relevant relay circuits) so that it is necessary for the test unit to initiate an activation in order to maintain the normal operating state, whereas in case that the test unit is not working/switched off ("passivation") a safety-focused failure reaction is initiated.

Figure 2:
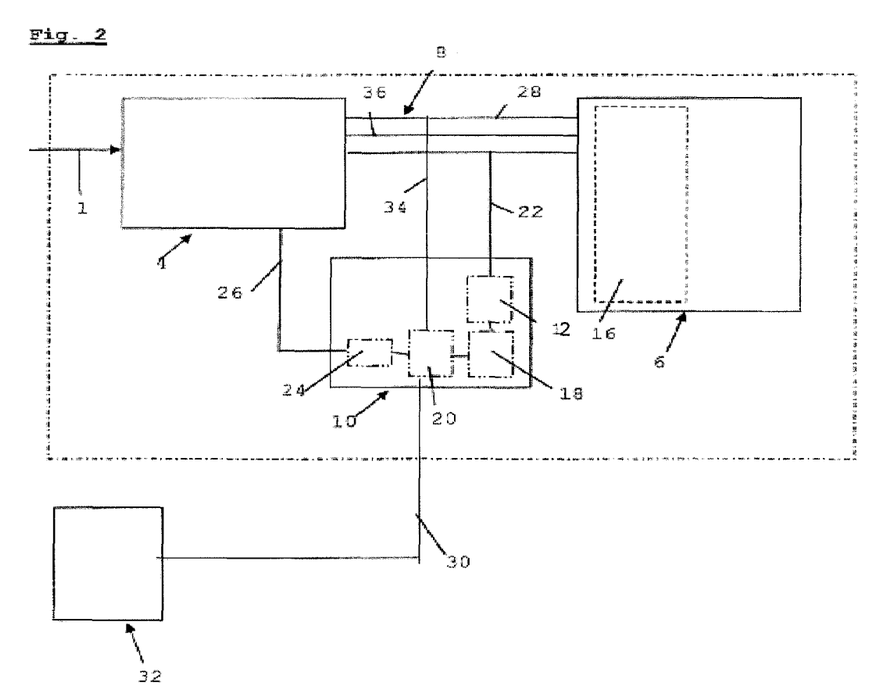
FIG. 2 shows a schematic diagram of a second preferred embodiment of a display in accordance with the present invention.

The alternative preferred embodiment of a display according to the present invention shown in FIG. 2 is to transmit the negative test result resulting from the safety test in the safe test unit 10 via a feed back circuit 30 to a superordinate processor 32 that then initiates the safety-focused reaction as, for example, decelerating the railcar. Alternatively, this transmission may also be made wireless which, of course, applies to all kinds of signals. This subordinate processor 32 can, for example, be part of the same "safe" main computer producing the actual value 14 communicated to PC 4.

Figure 3:
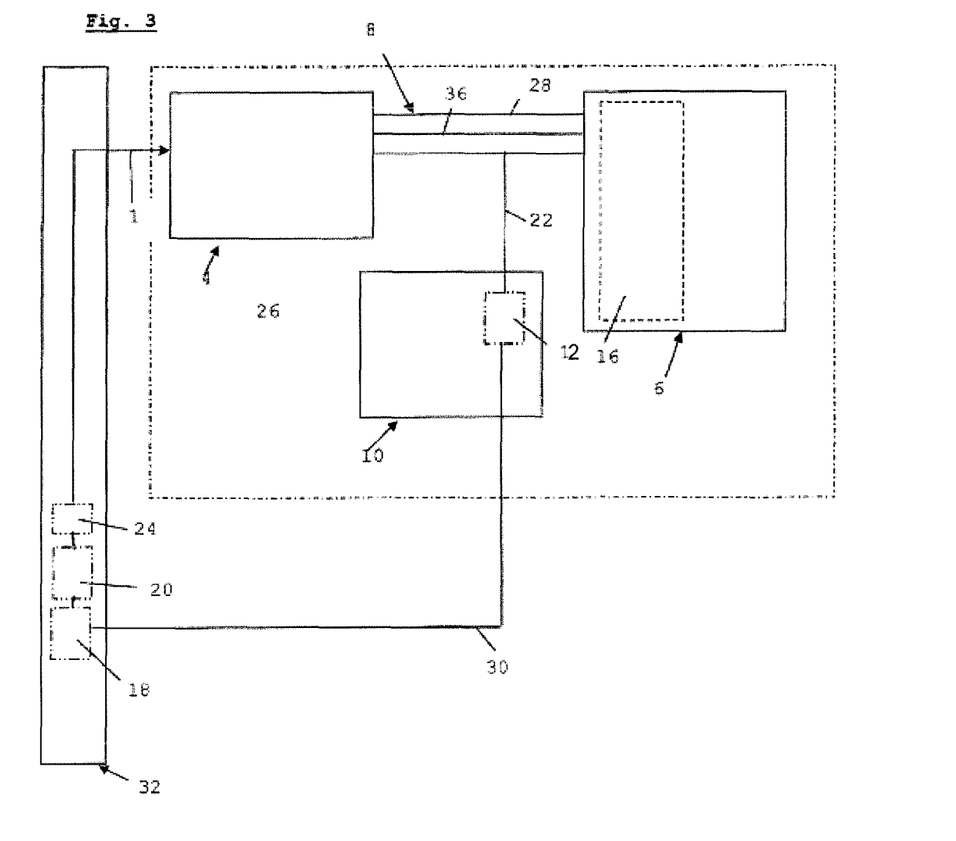
FIG. 3 is a schematic diagram of a third preferred embodiment of a display according to the present invention.

The simplified preferred embodiment shown in FIG. 3 differs from the ones according to FIGS. 1 and 2 in that the safe test unit 10 basically only comprises the test code generator 12 for generating the code for the "Fingerprint" of delimited area 16 of display 6. In this embodiment the further steps of the safety test are performed outside of the safe test unit 10, e.g. in the subordinate processor 32, also called a "safe computer", thus further simplifying the design of the test unit 10.

Figure 4:
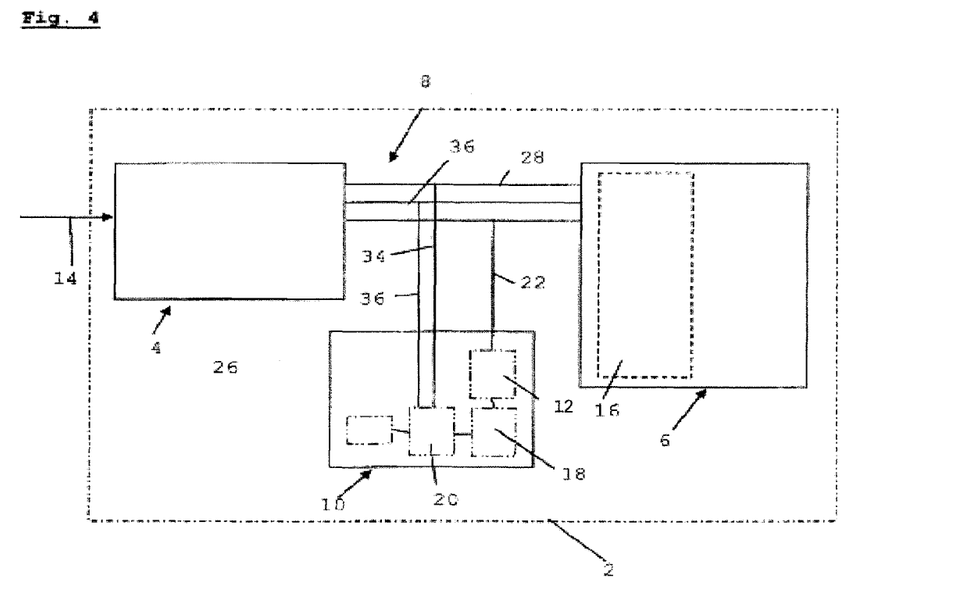
FIG. 4 is a schematic diagram of a fourth preferred embodiment of a display designed in accordance with the present invention.

In the preferred embodiment shown in FIG. 4 the input parameter 14 is not looped through PC 4. Instead the input parameter 14 together with the image corresponding for the input parameter 14 generated by the PC 4 is transmitted via display line 36 of LVDS 8 together and read out via line 38 to code generator 12 or in order to avoid a possible asynchronism between the input parameter 14 and the image data generated by PC 4 and then read back to the test unit 10 via read-back line 22 which may occur if transmission of the input parameter 14 is not timed correctly in the embodiment according to FIG. 1.

The scope of the present invention is not limited to the objects or methods of each single claim, but also spans the combination thereof. All objects and characteristics disclosed in the documents—including summary—especially the spatial representation shown in the drawings, are claimed to be essential to the present invention, as far as each of them or their combination is new in comparison to the state of the art. It is obvious for the person skilled in the art that the invention is not limited to the type of display described in the specific embodiments and can, of course, also be used with data or TFT projector.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for safe representation of safety-relevant information, the method comprising:
    entering an input parameter into a processor of a computer for generating image data;
    processing the input parameter to transform the input parameter into a sequence of image data that represents the input parameter;
    transmitting the sequence of image data to a display;
    representing the sequence of image data on the display;
    transmitting the sequence of image data to a test unit that is separate from the computer;
    transmitting the input parameter to the test unit; and
    carrying out a safety test comprising:
        computerized generation of a test code for the sequence of image data,
        checking the test code against several reference codes,
        assigning an identified reference code to a corresponding possible input parameter, and
        checking the corresponding possible input parameter against the input parameter transmitted to the test unit, with the test unit generating either a positive or a negative test result to provoke a safety-focused reaction.

2. The method according to claim 1, wherein the reference codes are integrated in the test unit.

3. The method according to claim 1, wherein the safety-focused reaction is initiated in the test unit if the safety test leads to a negative result.

4. The method according to claim 1, wherein the safety-focused reaction is initiated in a processor different from the test unit if the safety test leads to a negative result.

5. The method according to claim 1, wherein the safety-focused reaction includes the display to be switched off.

6. The method according to claim 1, wherein the safety-focused reaction is initiated only after a predefined number of negative test results.

7. The method according to claim 1, wherein a safety test is considered as a positive test result even if a value of the input parameter corresponds to several possible admissible reference values of the input parameter.

8. The method according to claim 7, wherein different sequences of image data are tested in the test unit in a parallel and independent manner.

9. The method according to claim 1, wherein several input parameters are processed in the processor, corresponding sequences of image data are transmitted to one or several displays and made visible thereon, and a corresponding test code is generated and tested for the sequences of image data.

10. The method according to claim 9, wherein different input parameters of several sequences of image data are represented on confined areas on the display.

11. The method according to claim 1, wherein generating the test code during the safety test involves at least one of CRC16, CRC32 and an equivalent coding method.

12. The method according to claim 1, wherein a section to be supervised is limited to a segment that completely characterizes the input parameter to be displayed to an observer.

13. The method according to claim 1, wherein a check value is added to the input parameter, and return of the check value is evaluated.

14. The method according to claim 13, wherein the check value is also computed.

15. The method according to claim 13, wherein the check value is included in a pixel serving as a data container.

16. The method according to claim 15, wherein the pixel serving as a data container is used to influence processing.

17. The method according to claim 16, wherein the pixel is used to change a range of one or more supervised areas on the display.

18. The method according to claim 1, wherein the input parameter is transmitted to the test unit within a data stream from the processor generating graphics to the display.

19. The method according to claim 1, wherein one or more reference codes are delivered together with the input parameter to the test unit for comparison with the test code generated from a current visualization.

20. A safety unit comprising:
    a computer for generating image data having a processor fed with the at least one input parameter to transform the at least one input parameter into a sequence of image data;
    a display connected to the computer to represent the image data; and
    a test unit that is separate from the computer and including a test code generator, several application-specific reference codes, a reference unit and an input circuit for transmitting the at least one input parameter to a memory in the test unit, the test code generator generating a test code for at least one readout part of the sequence of image data, comparing the generated test code with the existing reference codes and, in case they are in accordance with each other, assigning the identified reference code a corresponding input parameter as a reference and then comparing the reference with the input parameter in the memory in the reference unit in order to initiate the safety-focused reaction in case of non-conformance.

21. The safety unit according to claim 20, wherein the test unit is designed as an FPGA.

22. The safety unit according to claim 20, wherein the reference unit is located inside of the test unit.

* * * * *